United States Patent [19]

Johnson

[11] 4,159,711

[45] Jul. 3, 1979

[54] SOLAR HEATING APPARATUS

[76] Inventor: George P. Johnson, 1951 Hollywood Pkwy., York, Pa. 17403

[21] Appl. No.: 840,157

[22] Filed: Oct. 7, 1977

[51] Int. Cl.² ............................................. F24J 3/02
[52] U.S. Cl. .................................... 126/271; 165/106; 165/108
[58] Field of Search ....................... 126/270, 271, 400; 237/1 A; 165/106, 108

[56] References Cited

U.S. PATENT DOCUMENTS

| 895,761 | 8/1908 | Huntoon | 126/271 |
|---|---|---|---|
| 2,486,833 | 11/1949 | Freund | 126/271 |
| 3,179,105 | 4/1965 | Falbel | 126/271 |
| 3,200,820 | 8/1965 | Garrett | 126/271 |
| 4,056,093 | 11/1977 | Barger | 126/271 |
| 4,076,016 | 2/1978 | Phillips | 126/271 |

Primary Examiner—James C. Yeung
Attorney, Agent, or Firm—Charles J. Long

[57] ABSTRACT

Water or other heat-conducting liquid is heated in an upwardly open, substantially hemispherical outer bowl, the inside surface of which is treated to absorb heat from the sun's rays. The water or other liquid is introduced at the rim of the outer bowl and runs down the inside surface thereof, thereby being heated by the combined effects of the sun's rays and the heat absorbed by the outer bowl. A transparent, substantially hemispherical inner bowl is positioned within and spaced from the outer bowl to form a passageway for the water or other liquid. A tube or pipe is provided at the bottom of the outer bowl for allowing heated water or other liquid to drain from that bowl, and another tube or pipe is provided at the bottom of the inner bowl for allowing rain or melted snow to drain from that bowl.

9 Claims, 4 Drawing Figures

SOLAR HEATING APPARATUS

BACKGROUND OF THE INVENTION

I. Field of the Invention

This invention relates to apparatus for solar heating of water or other heat-conducting liquid. More particularly, it relates to such solar heating apparatus which is simple and inexpensive to fabricate and operate and in which the heat collector is in the shape of an upwardly open hemisphere and thus does not need to be moved to different positions to "track" the sun.

II. Description of the Prior Art

Many types of apparatus have been devised in the prior art in which solar energy is used to heat water or other heat-conducting liquid. Such prior art devices have various shortcomings, depending on the principle on which they are based.

One typical design of solar heat collector for liquid includes a heat-absorbing tube arranged in a serpentine configuration in one plane; such a planar-type collector is mounted at an angle facing the sun so that when the pipe has been heated by the sun's rays, liquid flowing therethrough absorbs the heat. The heated liquid is then utilized either directly or by running it through a heat-transfer system whereby its heat is transferred to a second liquid for use, for example, in heating a residence. While planar-type solar heat collectors perform adequately, they generally include long lengths of liquid-conducting pipe which must be properly bent to form the desired circuitous path for the liquid; in addition, in many such collectors, the liquid-conducting pipe is mounted in a substantially rectangular box, insulated against heat loss on all sides but the side facing the sun and covered with a transparent plate on the side facing the sun. Such features tend to make planar-type solar heat collectors expensive and in many cases difficult to fabricate. The principal difficulty with such a collector, however, is that in order to maximize the amount of heat collected thereby, the collector's position must be changed periodically throughout the daylight hours to "track" the sun, so that rays from the sun will strike the transparent plate surface perpendicularly and thereby not be reflected away from the pipe by the plate surface.

Another type of solar heater typical of prior art devices includes a collector utilizing reflectors or lenses so shaped or arranged as to concentrate the rays from the sun on one or a number of liquid-carrying pipes or, in some cases, an oven. Many of these devices must also be moved periodically to track the position of the sun during the day, so that the maximum amount of sunlight is reflected or concentrated on the liquid-carrying tubes or other container. In those collectors which reflect sunlight as a means of concentrating the same, the reflecting surface must be maintained free of dirt, dust and other materials which would impair its reflectivity; consequently, the reflecting-type units, whether or not they are difficult to fabricate, require meticulous maintenance if they are to perform at their optimum level. Collectors in which the sun's rays are concentrated upon a pipe or the like by means of lenses are both difficult to fabricate and often expensive and they, too, require a high degree of care to optimize the amount of heat extracted therefrom.

U.S. Pat. No. 3,254,644 discloses a solar heat cell which comprises a length of liquid-carrying pipe formed into an upwardly-facing concave conical configuration. The pipe, which is of heat-absorbing material, is heated by the sun's rays and transfers its heat to the liquid circulated through it; the conical shape of the arrangement is stated in the patent to present at least a portion of the tube surface perpendicular or tangent to the sun's rays during the daylight hours, thereby lessening the need for changing position of the cell to track the sun. While the device disclosed represents a step in the right direction, it nonetheless still has two disadvantages; first, forming a length of tube or hose into a tight spiral with a precise conical shape is time-consuming and/or expensive, and second, at those times of the day when the sun's rays strike only a small portion of the tube or pipe perpendicularly, the heat absorbed by that portion is not rapidly and efficiently transferred to the remainder of the pipe or tube, so that at such times the efficiency of the unit is extremely low.

SUMMARY OF THE INVENTION

I have devised solar heating apparatus for heating water or other heat-collecting liquid which is easy and inexpensive to produce and in which the heat collector does not have to be moved to track the risen sun. My solar heating apparatus is especially useful where extreme water temperatures are not required, such as in heating swimming pool water; however, by suitably banking a number of heat collectors it can also be used to achieve higher water temperatures.

In accordance with the invention, I provide a solar heat collector for heating water or other heat-conducting liquid, comprising an opaque, substantially hemispherical outer bowl; a transparent, substantially hemispherical inner bowl within and spaced from the outer bowl to form a passageway for liquid; dispensing means for introducing heat-conducting liquid at the rim of the outer bowl so that the liquid runs down the inside surface of the outer bowl; and outlet means for removing the liquid from the bottom of the outer bowl at a rate at least equal to the rate such liquid is introduced.

Preferably the inside surface of the outer bowl is treated to absorb heat from the sun's rays; ideally, the inside surface of the outer bowl is painted flat black.

For best operation, the outer bowl and inner bowl are positioned out of doors in full view of the sun, with the planes of their rims substantially horizontal, whereby the risen sun's rays will always strike the inside surface of the outer bowl perpendicularly at at least one point thereof.

In order to prevent the accumulation of rain or melted snow in the inner bowl, I may provide drainage means at the bottom of the inner bowl.

For best operation, the dispensing means are designed to introduce liquid substantially uniformly around the rim of the outer bowl.

Further in accordance with the invention, I provide apparatus for solar heating of water or other heat-conducting liquid, comprising, in combination, an upwardly open, substantially hemispherical outer bowl mounted out of doors in full view of the sun, the inner surface of the outer bowl being treated to absorb heat from the sun's rays; a transparent, substantially hemispherical inner bowl within and spaced from the outer bowl to form a passageway for liquid to be heated; dispensing means for introducing the heat-conducting liquid at the rim of the outer bowl so that liquid so introduced will run down the inside of the outer bowl, thereby being heated by the combined effects of the sun's rays and the heat absorbed by the outer bowl; outlet means at the bottom of the outer bowl for allowing heated liquid to drain from the outer bowl at a rate at least equal to the rate such liquid is introduced; a pressure tank containing heat-conducting liquid; a delivery pipe connecting the liquid in the pressure tank with the dispensing means; means for maintaining sufficient pressure on the liquid in the delivery pipe to force liquid from the pressure tank through the delivery pipe and the dispensing means, to thereby cause said liquid to run down the inside of the outer bowl; and means responsive to the temperature in the passageway for permitting flow of liquid through the delivery pipe when the passageway temperature exceeds a predetermined value and preventing such flow when the passageway temperature is below such value. Preferably, drainage means are provided at the bottom of the inner bowl, so that rain and melted snow will drain out of the inner bowl.

In a preferred embodiment, the apparatus includes a storage tank for storing heated liquid, the storage tank being positioned at a level below the bottom of the outer bowl, and a pipe connecting the outlet means at the bottom of the outer bowl with the storage tank, whereby heated liquid will flow from the outer bowl into the storage tank.

In a further preferred embodiment, the apparatus includes means responsive to the pressure in the delivery pipe for transferring liquid from the storage tank to the pressure tank whenever the pressure in the pressure tank drops below a predetermined value and for stopping such transfer when the pressure in the pressure tank exceeds such value.

BRIEF DESCRIPTION OF THE DRAWINGS

In the accompanying drawings I have shown a present preferred embodiment of the invention in which.

DESCRIPTION OF THE PREFERRED EMBODIMENTS

Figure 1:
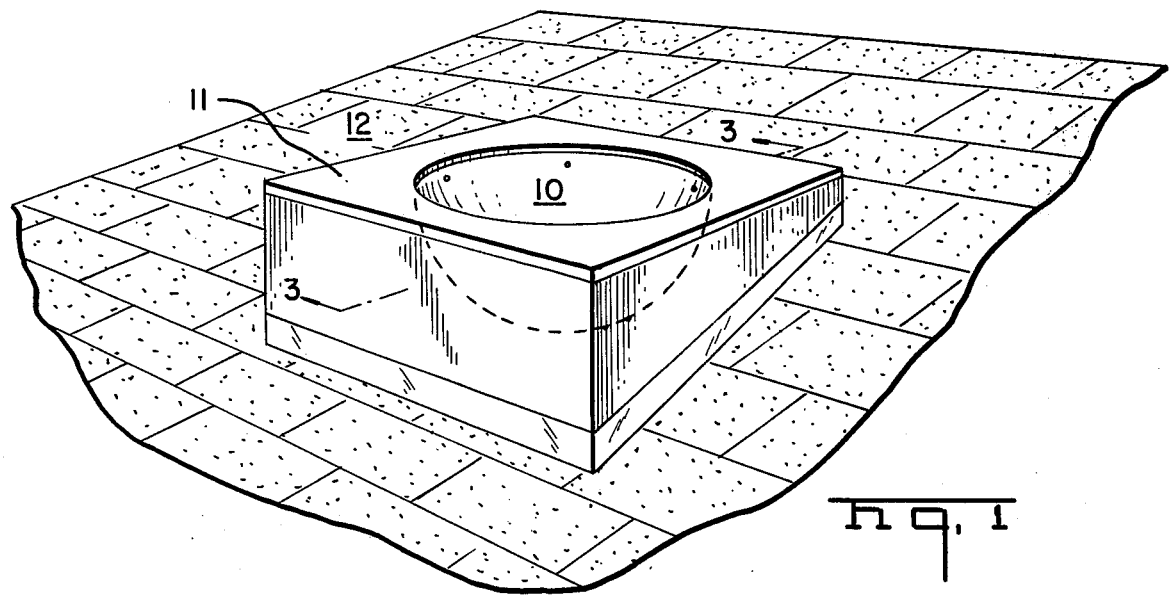
FIG. 1 is a fragmentary perspective view of a solar heat collector of the type disclosed, showing it in a typical roof-top installation.
Figure 2:
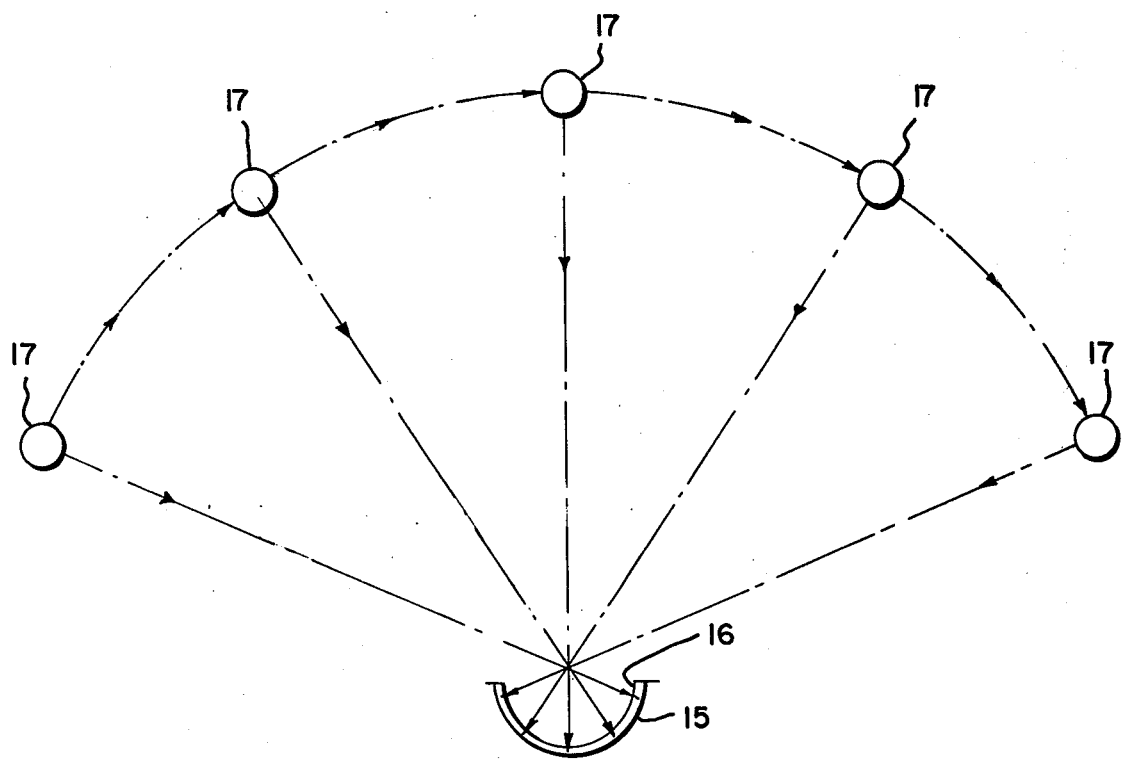
FIG. 2 is a diagrammatic view illustrating the ability of the disclosed solar heat collector to maintain a constant right angle contact with the sun's rays as the sun moves through its prescribed heavenly course.

Referring to FIG. 1 of the drawings, there is shown a solar heat collector of my invention, designated generally by reference numeral 10. The only portion of the collector 10 which is visible in FIG. 1 is a portion of the inner surface of the inner bowl thereof, described more fully hereinafter; however, the overall hemispherical shape of the collector is indicated by the dashed lines in the drawing. The solar heat collector 10 is mounted in an insulated housing 11, which in turn is positioned on the rooftop 12 of a house or other building in such a manner that the rim of the hemispherical inner bowl is in a substantially horizontal plane, which plane in FIG. 1 is at the level of the peak of the roof, so that the collector is in full view of the sun from sunrise to sunset. Referring to FIG. 2, it will be seen that the solar heat collector includes an outer bowl 15 of substantially hemispherical shape and the above-mentioned inner bowl 16, also of substantially hemispherical shape, positioned within and spaced from the outer bowl. The inner bowl 16 is transparent and thus allows the sun's rays to pass through it and strike the inside surface of the outer bowl 15, which is treated to absorb heat from the sun's rays, preferably by being painted flat black. As is evident from FIG. 2, the hemispherical shape of both the outer bowl 15 and the inner bowl 16, and the fact that the collector is positioned within full view of the sun, means that the rays of the sun, designated by reference numeral 17, will always strike at least a portion of the inside surface of the outer bowl 15 perpendicularly during the daylight hours, and that this will occur regardless of the sun's position throughout the year, i.e., with both the winter and summer sun. Since maximum heat from the sun's rays can be absorbed by a surface when the sun's rays strike it perpendicularly, it will be appreciated that my solar heat collector will always have at least one point absorbing solar heat at maximum efficiency during daylight hours.

Figure 3:
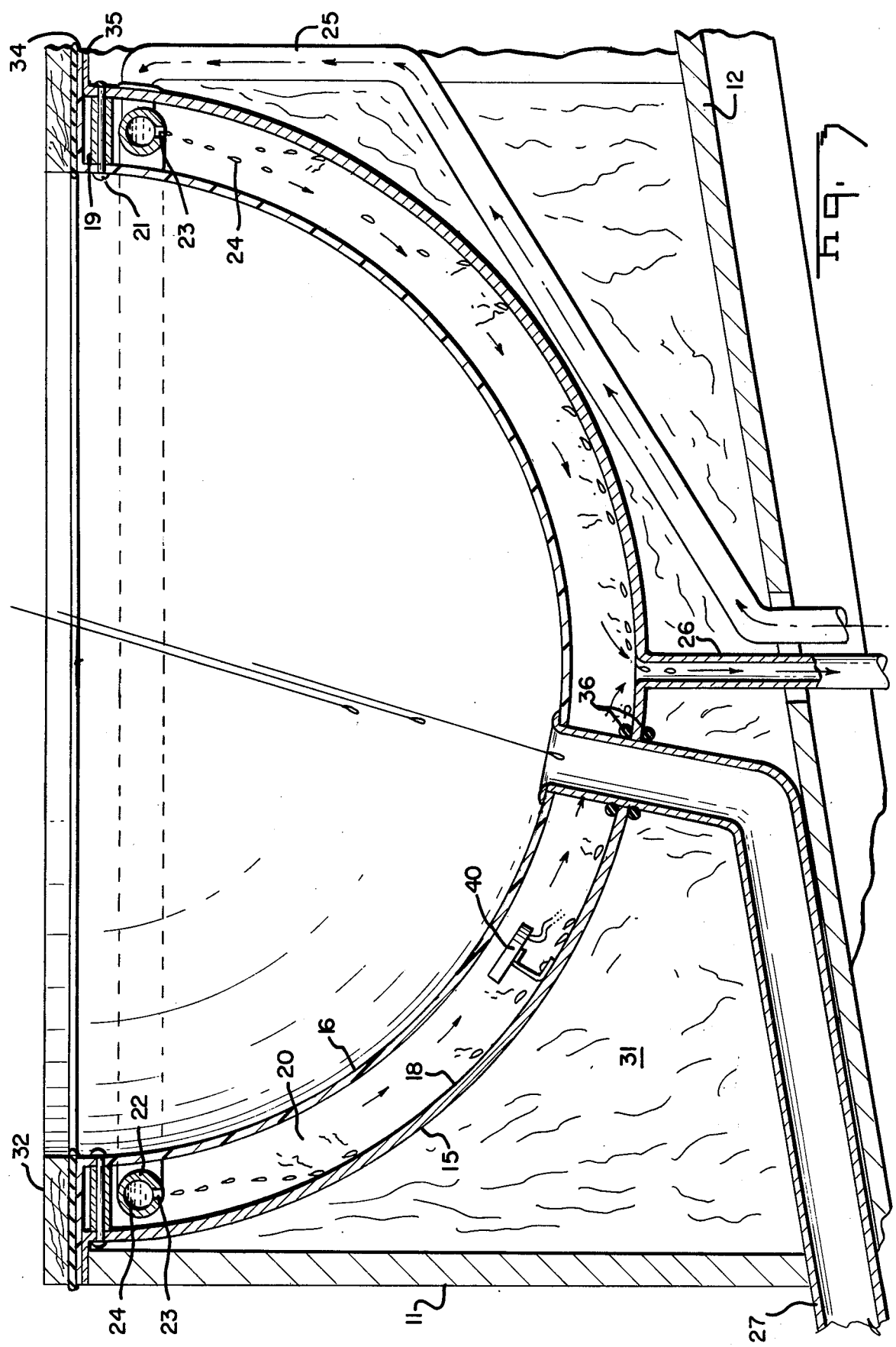
FIG. 3 is a cross-sectional view taken substantially along the line 3—3 of FIG. 1 and showing the construction of the disclosed solar heat collector.

Referring now to FIG. 3, my solar heat collector includes an opaque, substantially hemispherical outer bowl 15, which may be fabricated, for example, from sheet metal. The inner surface 18 of the outer bowl is treated to absorb heat from the sun's rays; as above mentioned, I prefer to paint the inner surface 18 with flat black paint for this purpose. Mounted within the outer bowl 15, and spaced therefrom by spacers 19 positioned around the circumference of the assembly, is a transparent, substantially hemispherical inner bowl 16, which may be formed from plexiglass or other transparent material. The inner bowl and outer bowl in combination form a hemispherical space or passageway 20 for water or other heat-conducting liquid. The two bowls are held in position relative to one another by rivets 21 passing through holes in the spacers 19.

I have found that a distance of from about one and one-half inches to about two inches between the wall of the outer bowl 15 and the wall of the inner bowl 16 is suitable for my purposes, although such distances are not limiting. In operation, the rays of the sun heat both the outer bowl 15 and the air in the passageway 20, and these two heated portions transfer heat to the water or other liquid introduced into the passageway; I have found that too much space between the bowls prevents sufficient heat build-up, while with too little space the water or other liquid introduced into the passageway tends to cool the unit down rather than being heated itself.

Within the passageway 20, and close to the top thereof viewing FIG. 3, is a dispensing ring 22 with a series of holes 23 in the bottom of the ring. Water or other heat-conducting liquid 24 is fed into the dispensing ring 22 via a delivery pipe 25; the water or other liquid flows out of the dispensing ring through the holes 23 and is thereby introduced at the rim of the outer bowl 15 from which point it runs down the inside surface 18 of the outer bowl. I have found that for best operation the number of holes 23 in the dispensing ring 22, and the spacing between such holes, should be such that the water or other heat-conducting liquid is introduced substantially uniformly around the rim of the outer bowl 15; additionally, the diameter of the holes 23 should be large enough so that the holes do not become clogged, for example by excessive mineral content of water introduced therethrough. Both the dispensing ring 22 and the delivery pipe 25 may be of PVC plastic or other suitable materials. At the bottom of the outer bowl 15 is an outlet pipe 26 so sized that it has the capacity to drain liquid from the bottom of the outer bowl at a rate at least equal to the rate such liquid is introduced through the holes 23 in the dispensing ring 22; this prevents accumulation of liquid in the passageway 20, which will impair the functioning of the heat collector.

At approximately the bottom of the inner bowl 16 is a drainage pipe 27 which passes through the passageway and the wall of the outer bowl 15. The function of the drain pipe 27 is to allow rain and melted snow to drain out of the inner bowl, so that the passage of the sun's rays through the inner bowl will not be impeded. The drain pipe 27 is appropriately sealed where it passes through the wall of the outer bowl 15 to prevent leaks; such sealing may be accomplished by rubber seals 36 indicated in FIG. 3.

The solar heat collector of FIG. 3 is mounted in a housing 11 which may be made of wood or other desired material, and which is provided with insulation 31 surrounding the heat collector to minimize loss of heat from the collector to the surrounding atmosphere. The housing, which is desirably square in horizontal cross-section, is provided with a cover 32 having a circular opening therein substantially equal to the diameter of the inner bowl 16. The outer bowl 15 and the inner bowl 16 are provided with flanges 35 and 34, respectively, which extend to a common diameter substantially equal to the overall width of the housing 11; since the housing is square in horizontal cross-section, the flanges are supported at the mid-point of each of the four walls of the housing. The cover 32 serves to hold the inner bowl-outer bowl combination in place on the housing 11 and to protect from rain, snow, etc., the sectors of the housing cross-section not taken up by the bowls. The relationship between the housing bowls and cover can be seen clearly in FIG. 1. The housing 11 is mounted on the roof 12 of a home or other building in such position that the rims of the inner and outer bowls lie in a substantially horizontal plane, as is also indicated clearly in FIG. 1.

The principle by which the solar heat collector of FIG. 3 operates is as follows: Rays of the sun pass through the inner bowl 16 and strike the inside surface 18 of the outer bowl 15. The outer bowl 15 thereby absorbs heat, as does the air in the passageway 20 between the two bowls. Water or other heat-conducting liquid 24 is introduced at the rim of the outer bowl 15 by means of the holes 23 in the dispensing ring 22. The water or other heat-conducting liquid 24 so introduced runs down the inside surface 18 of the outer bowl 15 and in so doing absorbs heat from both the heated outer bowl and the heated air in the passageway. The heated water drains from the outer bowl by means of drain pipe 26, which carries it to suitable storage or pumping means, as desired.

In order for the water or other heat-conducting liquid introduced at the rim of the outer bowl to be heated rather than merely cooling down the outer bowl and passageway, it is necessary that no liquid be so introduced unless and until the temperature of the passageway is suitably high. In order to control the introduction of water or other heat-conducting liquid, a thermostat 40, responsive to the temperature of the air in the passageway 20, is mounted with its sensing surface approximately halfway between the outer bowl 15 and the inner bowl 16; such mounting is necessary to avoid having the thermostat affected by any liquid passing over the inside surface of the bowl. The location at which thermostat 40 is mounted on the surface of the outer bowl 15 is not critical, except that it obviously should not be mounted in any position where water entering the passageway 20 from the dispensing ring 22 would fall upon or otherwise contact its sensing surface. As is more evident in FIG. 4, the thermostat is connected to a solenoid valve in delivery pipe 25 and is so adjusted that it opens the valve when the passageway temperature exceeds the predetermined value and closes the valve when the passageway temperature is below such value, thereby respectively permitting and preventing flow of liquid through the delivery pipe 25.

Figure 4:
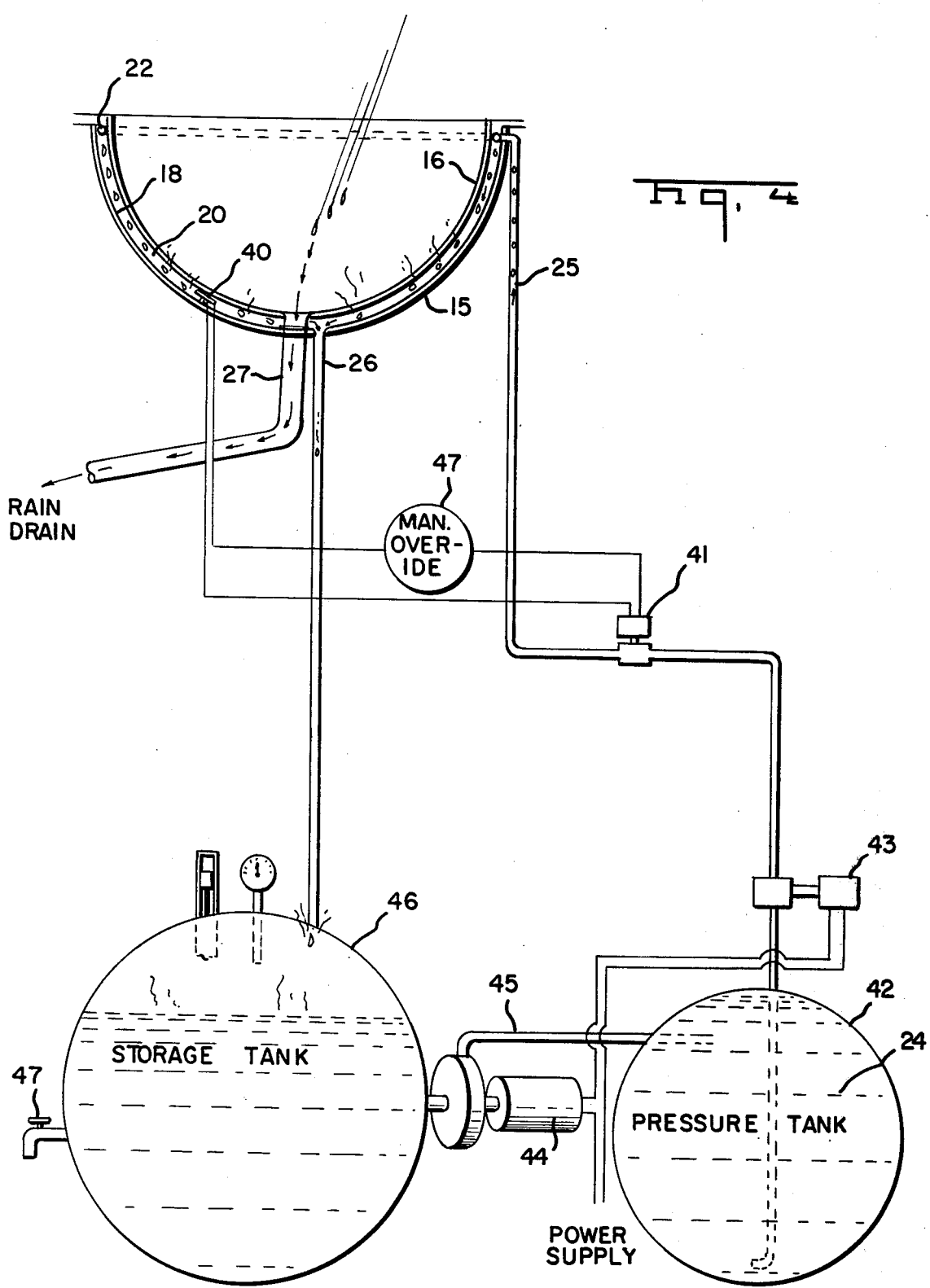
FIG. 4 is a diagrammatic view illustrating solar heating apparatus of the type disclosed which makes up an entire water heating system.

Turning to FIG. 4, there is shown in diagrammatic view apparatus for solar heating of water or other heat-conducting liquid which utilizes the solar heat collector of FIG. 3. The apparatus comprises an upwardly open, opaque, substantially hemispherical outer bowl 15 which, though not indicated in FIG. 4, is mounted out of doors in full view of the sun. The inner surface 18 of the bowl 15 is treated to absorb heat from the sun's rays.

As in FIG. 3, a transparent, substantially hemispherical inner bowl 16 is mounted within and spaced from the outer bowl 15 to form a passageway 20 for liquid to be heated. Mounted in the passageway 20 near the rim of the outer bowl 15 are dispensing means 22, comprising a dispensing ring as described hereinabove with reference to FIG. 3. Outlet means comprising a pipe 26 are provided at the bottom of the outer bowl to allow heated liquid to drain the outer bowl. A pressure tank 42, which may be of any convenient size and shape, contains water or other heat-conducting liquid 24 and a delivery pipe 25 connects the liquid in the pressure tank 42 with the dispensing means 22. The liquid 24 in the pressure tank is maintained at sufficient pressure to force it from the pressure tank through the delivery pipe 25 and the dispensing means 22 by means of a pressure switch 43 which activates a pump 44 when the fluid pressure in pipe 25 falls below the necessary value. On activation, the pump 44 pumps liquid through pipe 45 and into the tank 42 to increase the pressure on liquid 24 by increasing the head of pressure acting on the end of the delivery pipe 25. The pump 44 can draw liquid either from water lines, for example, or from a storage tank 46 as in FIG. 4.

A thermostat 40 mounted in the passageway 20 is electrically connected to a solenoid valve 41. The thermostat opens the valve to allow liquid to flow from pressure tank 42 through delivery pipe 25 to the dispensing ring 22 whenever the temperature in the passageway 20 is hot enough to provide adequate heating of the liquid introduced into the passageway 20, and closes the valve 41 when the temperature drops below the necessary value. In the event it becomes desirable to introduce liquid into the passageway 20 independently of the thermostatically-controlled valve, a manual override switch 47 is provided in the thermostat circuitry.

As above indicated, a storage tank 46 is provided at a level lower than the bottom of the outer bowl 15 and is connected to the outer bowl by outlet pipe 26; the storage tank is used for storing liquid that has been heated by the heat collector. From the storage tank, heated liquid can be withdrawn by means of spigot 47, or it can be circulated, if desired, for example through a swimming pool; in addition, liquid is withdrawn periodically from the storage tank by pump 44 to replenish the supply and/or pressure of liquid in pressure tank 42. If it is necessary to add liquid to the storage tank, the same may be obtained from a city water supply or, if desired, drain pipe 27 can be formed so as to direct rain and melted snow from the inside of the inner bowl into the storage tank 46.

The apparatus of FIG. 4 conserves energy in several ways. Principally, of course, it does so by utilizing heat from the sun to heat the liquid. In addition, however, by maintaining sufficient pressure on the liquid in pressure tank 42 to force liquid through the delivery pipe and dispensing means into the passageway 20, there is no need for a pump to run whenever the thermostat 40 calls for liquid to be supplied; instead, all that is needed in such case is to open the solenoid valve 41, which requires less energy than required to operate a pump. Although energy is required to operate pump 44, that pump will only be activated when the pressure in pressure tank 42 drops below the necessary value, and this will not happen each time liquid is withdrawn from the pressure tank; in fact, with a sufficiently large pressure tank, it is possible for long periods of time to pass between pressure pump activations.

With only a single heat collector, my solar heating apparatus performs best in relatively moderate heating applications such as providing heat to water circulating through a swimming pool. For more difficult heating requirements, several heat collectors can be blanked to feed heated water or other liquid to a common storage tank; in such version of my apparatus, I may use either a common pressure tank feeding all the collectors or a separate pressure tank-pump combination for each collector.

While I have shown and described certain present preferred embodiments of the invention, it is to be distinctly understood that the invention is not limited thereto, but may be otherwise variously embodied within the scope of the following claims:

I claim:

1. Apparatus for solar heating of water or other heat-conducting liquid, comprising, in combination:
    an upwardly open, substantially hemispherical outer bowl mounted out of doors in full view of the sun, the inner surface of the outer bowl being treated to absorb heat from the sun's rays;
    a transparent, substantially hemispherical inner bowl within and spaced from the outer bowl to form a substantially hemispherical passageway for liquid to be heated;
    the outer bowl and inner bowl being positioned so that the planes of their rims are substantially horizontal;
    dispensing means for introducing the heat-conducting liquid at the rim of the outer bowl so that liquid so introduced will run down the inside of the outer bowl, thereby being heated by the combined effects of the sun's rays and the heat absorbed by the outer bowl;
    outlet means at the bottom of the outer bowl for allowing heated liquid to drain from the outer bowl at a rate at least equal to the rate such liquid is introduced;
    a pressure tank containing heat-conducting liquid;
    a delivery pipe connecting the liquid in the pressure tank with the dispensing means;
    means for maintaining sufficient pressure on the liquid in the delivery pipe to force liquid from the pressure tank through the delivery pipe and the dispensing means, to thereby cause said liquid to run down the inside of the outer bowl; and
    means responsive to the temperature in the passageway for permitting flow of liquid through the delivery pipe when the passageway temperature exceeds a predetermined value and preventing such flow when the passageway temperature is below such value.

2. Apparatus as claimed in claim 1, in which drainage means are provided at the bottom of the inner bowl, whereby rain and melted snow will drain out of the inner bowl.

3. Apparatus as claimed in claim 2 including a storage tank for storing heated liquid, the storage tank being positioned at a level below the bottom of the outer bowl; and
    a pipe connecting the outlet means at the bottom of the outer bowl with the storage tank, whereby heated liquid will flow from the outer bowl into the storage tank.

4. Apparatus as claimed in claim 3 including means responsive to the pressure in the delivery pipe for transferring liquid from the storage tank to the pressure tank whenever the pressure in the pressure tank drops below a predetermined value and for stopping such transfer when the pressure in the pressure tank exceeds such value.

5. A solar heat collector for heating water or other heat-conducting liquid, comprising:
    an opaque, substantially hemispherical outer bowl;
    a transparent, substantially hemispherical inner bowl within and spaced from the outer bowl to form a substantially hemispherical passageway for liquid;
    the outer bowl and inner bowl being positioned out of doors in full view of the sun, with the planes of their rims substantially horizontal, whereby the risen sun's rays will always strike the inside surface of the outer bowl perpendicularly at at least one point thereof;
    dispensing means for introducing heat-conducting liquid at the rim of the outer bowl so that the liquid runs down the inside surface of the outer bowl; and
    outlet means for removing the liquid from the bottom of the outer bowl at a rate at least equal to the rate such liquid is introduced.

6. A solar heat collector as claimed in claim 5, wherein the inside surface of the outer bowl is treated to absorb heat from the sun's rays.

7. A solar heat collector as claimed in claim 6, wherein the inside surface of the outer bowl is painted flat black.

8. A solar heat collector as claimed in claim 7, in which drainage means are provided at the bottom of the inner bowl, whereby rain and melted snow will drain out of the inner bowl.

9. A solar heat collector as claimed in claim 8, wherein the dispensing means are designed to introduce liquid substantially uniformly around the rim of the outer bowl.

* * * * *

UNITED STATES PATENT AND TRADEMARK OFFICE
CERTIFICATE OF CORRECTION

PATENT NO. : 4,159,711
DATED : July 3, 1979
INVENTOR(S) : GEORGE P. JOHNSON

It is certified that error appears in the above-identified patent and that said Letters Patent are hereby corrected as shown below:

Column 6, line 30, insert -- from -- between "drain" and "the".

Column 7, line 26, delete "blanked" and substitute -- banked -- therefor.

Signed and Sealed this

Second Day of October 1979

[SEAL]

Attest:

RUTH C. MASON
Attesting Officer

LUTRELLE F. PARKER
Acting Commissioner of Patents and Trademarks